UNITED STATES PATENT OFFICE.

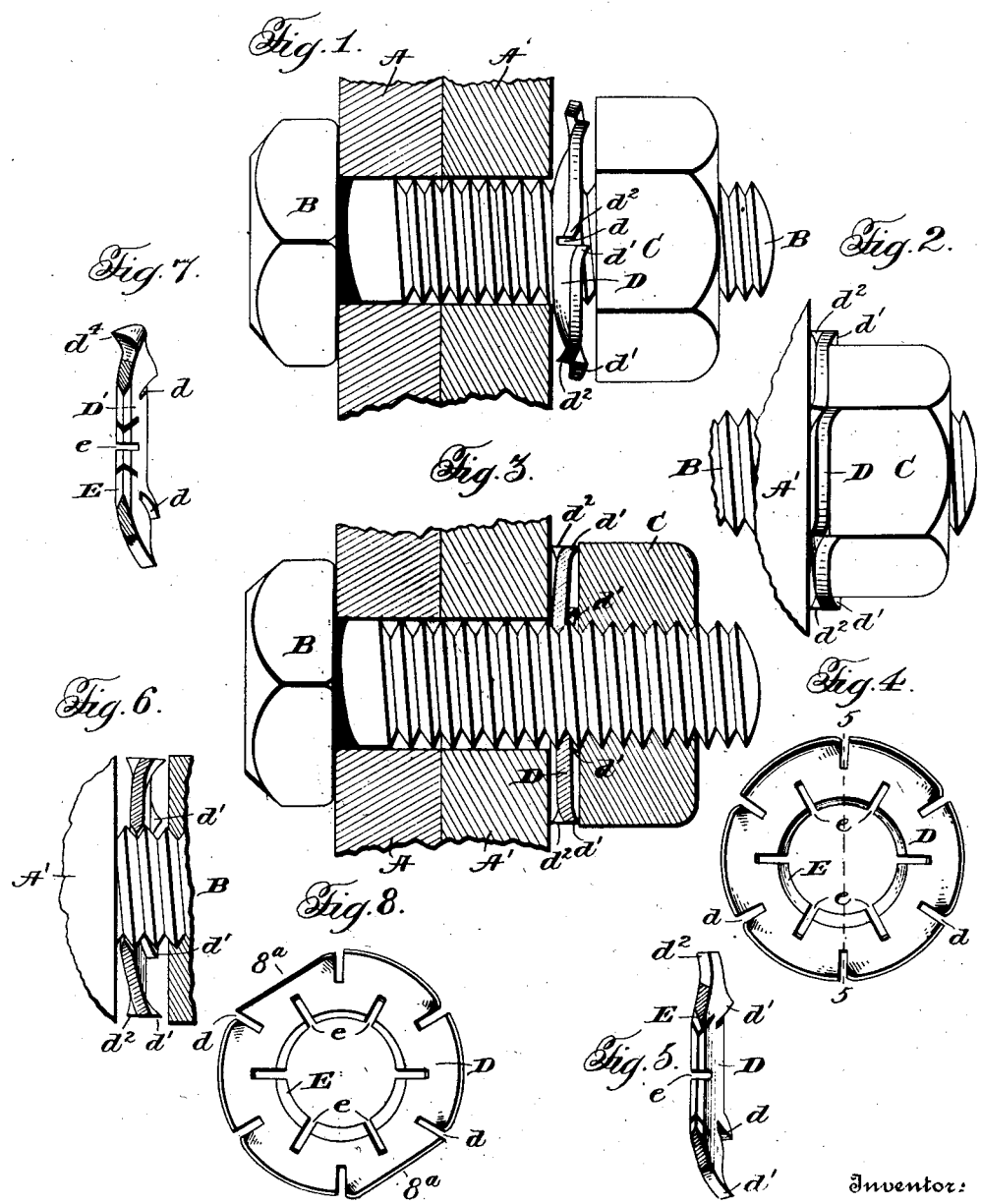

ALANSON D. GASTON, OF WASHINGTON, DISTRICT OF COLUMBIA.

COMBINED NUT AND BOLT LOCK.

1,391,378. Specification of Letters Patent. Patented Sept. 20, 1921.

Application filed September 26, 1918. Serial No. 255,840.

*To all whom it may concern:*

Be it known that I, ALANSON D. GASTON, citizen of the United States, residing at Washington, in the District of Columbia, have invented certain new and useful Improvements in Combined Nut and Bolt Locks, of which the following is a specification, reference being had therein to the accompanying drawing.

This invention relates to improvements in combined nut and bolt locks and is embodied in the construction shown in the accompanying drawings and hereinafter described.

The object of the invention is to provide a simple device which will perform the duty of both a bolt and nut lock; one that can be cheaply manufactured and which will serve well the purposes intended.

A convenient embodiment of the invention is shown in the accompanying drawings, together with a modification thereof involving the principles, but it is to be understood that still further modifications of the structure can be made within the scope of the claims without departing from the nature and principle of the invention.

Figure 1 is a side elevation of the bolt nut and an applied lock-washer, parts being positioned for setting up.

Fig. 2 is a similar view, showing a smaller sized nut, with the parts set up, members being broken away.

Fig. 3 is a sectional view of Fig. 1 with the parts set up as suggested in Fig. 2.

Fig. 4 is a plan view of the lock-washer.

Fig. 5 is a section.

Fig. 6 is a detail section showing the arrangement depicted in Fig. 3 with the parts separated, Fig. 7 is a modified form showing a slightly different type of engaging tooth on the outer portion of the washer, Fig. 8 is a modified form of lock.

In the art of nut and bolt locks, it has heretofore been suggested to employ what is now commonly known as a split washer, having one terminal offset in one direction and the adjacent terminal offset in the opposite direction. Such devices have been found quite satisfactory but are limited to a single resisting contact point. It has also been suggested to employ a concave-convex washer arranged so that when compressed the edges surrounding the bolt will grip the bolt. Such devices are employed for bolt locking and possess features rendering them somewhat objectionable. My invention is designed to provide a combined bolt and nut lock which can be economically manufactured and which will serve its purpose well both in maintaining the bolt against turning and also the nut.

In the drawings, A and A' represent the parts to be united, and part A' may be considered as an ordinary fish plate. B designates a bolt of conventional type, and C the nut preferably of hexagonal form. D designates the improved lock washer which is constructed in the form of a concave-convex disk of spring steel having a series of radial slots $d$ spaced conveniently and equi-distance apart. The slots extend conveniently to a point substantially midway of the width of the disk and the metal between the slots is of dove-tail shape and represents the locking portion. Each portion of the disk between the slots $d$ are shaped so that one edge is deflected in one direction while the opposing edge is bent in the opposite direction and form biting edges $d'$, $d^2$. There are conveniently four or six engaging or locking portions, each of which is provided with the biting edges or end parts which are deflected as stated, in opposite directions.

The inner edge of the disk is fashioned to correspond with the pitch of the thread of the bolt and is inclined or beveled as at E to fit the valley between the threads of the bolt, and can be made so as to pass over the threads of the bolt, especially for wood, and the lower points should be of sufficient sharpness to seat in the wood and prevent dragging the washer on first applying the nut. For this use the washer can be made larger if desired, (Fig. 7). The part of the plate which borders the central opening therein is slotted radially by slots $e$ which extend outwardly to a point approximate the center of the width of the disk. These slots $e$ conveniently project approximately to a point in line or on the plane of the inner ends of the outer slots $d$. When the washer is in its normal condition the central opening therein has a diameter slightly greater than the diameter of the bolt from the base of the valley of the threads thereof, as shown in Fig. 6.

The diameter of the lock-washer is conveniently less than the diameter of the nut, as shown in Figs. 1, 3 and 6, so that when the nut is forced down the biting edges of the parts $d'$, $d^2$ will engage the inner surface of the nut. In assembling the parts, the lock-washer is turned onto the bolt or put on over the bolt, until the convex surface thereof engages the plate A'. The nut is then turned onto the bolt and forced home until the washer is compressed substantially to a flat condition. This action tends to contract the center opening of the washer and to cause the threaded edge thereof to tightly grip the bolt between the threads, as shown in Fig. 3. This act of tightening the nut also causes the biting edges of the holding parts of the washer to engage the inner face of the nut and the outer face of the plate. In this condition, the nut is held against backward movement owing to the biting teeth of the washer engaging the same, while the washer is held against movement by engaging the plate A' at the same time the bolt is clamped or held against independent movement. By radially slotting the disk, as stated, the requisite spring action is obtained for both the inside and the outside portions of the lock-washer and an effective gripping action is thereby secured for the biting or projecting ends of the outer portions of the washer. A positive clamping action is also provided, the metal yielding readily to the action of the nut owing to the relative positions of the slots in the lock-washer.

Should it be desired to use the construction with a nut slightly smaller in diameter than that of the washer, as shown in Fig. 2, the projecting parts $d'$ will engage the angles of the nut and will hold it against moving backward, the other parts acting as in the former described construction.

In Fig. 7 is shown a slightly modified form wherein the tooth or biting part $d^4$ of the washer D' is rounded and projected outwardly a distance greater than that of the other form. This is desirable when the washer is to be used against a wooden base or member, as the same will penetrate the wood more readily.

It will be observed that when the parts are in place, because of the concavo-convex shape of the washer and the resilient character thereof, a constant spring pressure is maintained on the nut, even after the same is set. This of course increases the binding characteristics of the lock with respect to the nut and base associated therewith.

While I have illustrated the lock member or washer as taking a circular outline, it is to be borne in mind that other configurations may be resorted to and still be within the spirit of the invention. To illustrate, the washer may be provided with a square, hexagonal or other shape whereby to receive a wrench or other tool in the application or removal of the same. This is well illustrated by the modified form of washer disclosed in Fig. 8 of the drawings in which two opposed sections of the washer have a strengthened edge $8^a$ as distinguished from the general curvature of the other parts of the washer. It is obvious that by applying opposite jaws of a wrench or the like in contact with the opposed straight edges $8^a$ of this type of washer, or other type of washer having opposed straight edges, the washer may be more readily applied and removed as occasion demands.

Having thus described the invention, what is claimed as new and desired to be secured by Letters Patent is:

1. A combined nut and bolt lock comprising a concavo-convex disk having a series of radial slots entering from the outer edge thereof and a series of radial slots entering from the inner edge thereof, said inner edge being formed to enter the threaded portion of a bolt, the edges of the disk at the outer slots being bent in opposite directions, for purposes specified.

2. A combined nut and bolt lock comprising a concavo-convex disk having a central bore with the inner edge thereof threaded to fit the thread of the bolt but normally of greater diameter, a series of radial slots entering from said edge, and a series of slots entering from the outer edge of the disk, the metal at the ends of the portion between the outer slots being bent in opposite directions.

3. The combination with a bolt, a plate through which the same passes, a nut on the bolt and an interposed bolt and nut lock consisting of a concavo-convex disk having a series of radial slots in its outer edge with the end portions of the metal between the slots bent in opposite directions, a central bore having an edge formed to fit between the threads of the bolt, and a series of radial slots extending from said edge into the metal of the washer intermediate the said other slots.

4. A combined bolt and nut washer consisting of a spring metal concavo-convex disk having a central threaded bore with a series of slots radiating therefrom to a point approximating the center of the width of the disk, the edges of each slotted portion being in approximately the same plane, and a series of slots entering from the outer edge of the disk inwardly at points intermediate said other slots, the ends of the metal between the slots and the outer portion of the disk being bent outwardly in opposite directions to form biting teeth, substantially as described.

5. A nut lock in the form of a perforated concavo-convex metal washer having a series of slots entering from the outer edge and a series of slots entering from an inner edge adapted to engage the surface of a bolt, the metal of the outer edge between the slots being laterally offset to form a tooth engaging part, substantially as described.

6. A combined nut and bolt lock comprising a concavo-convex disk having a series of radial slots projecting from the outer edge thereof inwardly, and one or more radial slots arranged in alternate relation with respect to the first mentioned slots projecting outwardly from the inner edge thereof, the edges of the disk at the outer slots projecting in opposite directions substantially as and for the purpose described.

7. A combined nut and bolt lock comprising a disk having a central opening to engage over the bolt, and the wall surrounding said opening being shaped to enter the threaded portion of the bolt, said disk having a series of radial slots entering from the outer edge thereof, and a series of radial slots entering from the inner edge thereof, the edges of the material at the outer slots being bent in opposite directions, and the disk being constructed whereby to exert constant spring pressure on the nut.

8. A combined nut and bolt lock comprising a conical shaped disk having a central opening to engage over the bolt with the edge of the wall surrounding said opening formed to enter the threaded portion of the bolt, said disk being slotted at its outer edge to form a plurality of dove-tail shaped sections and bent whereby opposite edges of said sections are disposed at opposite directions, and said disk also having radial slots at its inner edge.

9. A nut lock formed of a concavo-convex member having a series of slots entering from the outer edge, and a series of slots entering from the inner edge, the metal at the outer edge between the slots being normally offset whereby to form a tooth or engaging part.

10. A combined nut and bolt lock comprising a concavo-convex disk having a central bore of sufficient size to slip over the threaded portion of a bolt, the inner edge of the disk being shaped to fit the threads of the bolt when in locking position, said disk having a series of radial slots entering from the inner edge and a series of slots entering from the outer edge thereof and arranged in alternate relation with regard to the first mentioned slots, and the metal at the ends of the portions between the outer slots being offset in opposite directions.

In testimony whereof I hereunto affix my signature.

ALANSON D. GASTON.